United States Patent
Stoltzfus et al.

(10) Patent No.: US 7,182,285 B1
(45) Date of Patent: Feb. 27, 2007

(54) TIRE RUBBER GRANULATOR

(75) Inventors: Philip Stoltzfus, Lititz, PA (US); John Stoltzfus, Lebanon, PA (US); Michael Glant, Lebanon, PA (US)

(73) Assignee: Flintwood Metals, Inc., Lebanon, PA (US)

( * ) Notice: Subject to any disclaimer, the term of this patent is extended or adjusted under 35 U.S.C. 154(b) by 0 days.

(21) Appl. No.: 11/336,356

(22) Filed: Jan. 20, 2006

(51) Int. Cl.
*B02C 7/04* (2006.01)
*B02C 1/10* (2006.01)

(52) U.S. Cl. .................................. 241/261.2; 241/298

(58) Field of Classification Search ............. 241/261.2, 241/261.3, DIG. 31, 296, 297, 298, 242
See application file for complete search history.

(56) References Cited

U.S. PATENT DOCUMENTS

| 755,989 | A | 3/1904 | Barker et al. |
|---|---|---|---|
| 3,942,730 | A | 3/1976 | Coucher |
| 4,034,921 | A | 7/1977 | Schnitzer |
| 4,171,101 | A | 10/1979 | Seifert et al. |
| 4,614,308 | A | 9/1986 | Barclay |
| 5,024,386 | A | 6/1991 | Morris |
| 5,048,764 | A | 9/1991 | Flament |
| 5,624,078 | A | 4/1997 | Bredbeck |
| 5,768,764 | A | 6/1998 | Batt |
| 5,785,263 | A | 7/1998 | Wu et al. |
| 5,904,305 | A | 5/1999 | Kaczmarek |
| 5,921,480 | A | 7/1999 | Wenzel |
| 5,927,627 | A | 7/1999 | Edson et al. |
| 6,024,308 | A | 2/2000 | Bartels et al. |
| 6,036,128 | A | 3/2000 | Cramer |
| 6,249,949 | B1 | 6/2001 | Cross, Jr. et al. |
| 6,976,646 | B2 * | 12/2005 | Morris et al. .................. 241/23 |

* cited by examiner

*Primary Examiner*—Faye Francis
(74) *Attorney, Agent, or Firm*—Andrew D. Mead

(57) ABSTRACT

A comminution apparatus for refining various materials into smaller pieces of a desired size, the apparatus having a pair of generally circular disks disposed on a common axis and arranged generally parallel to one another forming a comminution region there between. Each disk incorporates a plurality of removable cutting bars radially disposed on the disk face, one disk having an even number, the other having an odd number of cutting bars. Process material is fed into the comminution space between the opposing disks and comminuted by counter-rotation of the disks which shears material between opposing cutting bars as they pass. Spacing between the disks is adjustable to suit the input process material. Tapered disk faces control the flow of material during the comminution process, permitting only material that has been sufficiently reduced in size to migrate toward the disk perimeter where a skirt ring structure controls the size of the granulated material output.

20 Claims, 6 Drawing Sheets

TIRE RUBBER GRANULATOR

BACKGROUND OF THE INVENTION

1. Field of the Invention

This invention deals generally with industrial machines for comminuting and disintegrating solid material. In particular, this invention relates to grinding machines for reducing scrap tires into crumb rubber.

Hundreds of millions of scrap tires are generated every year in the United States. At one time the majority of these tires would end up in landfills. Current estimates are that as many as 300 million scrap tires may be stockpiled, but millions more may already be buried in landfills where they remain uncounted. Stockpiling scrap tires poses serious environmental and health risks stemming from the risk of large, uncontrolled fires in tire piles and spread of disease by insects and vermin for whom tire piles serve as prime breeding grounds. Recycling addresses these risks and allows recovery of a significant economic resource.

The waste stream of used tires continues to grow. In light of concern for this growing problem, tire recycling has become increasingly important. It encourages research for economical uses for recycled rubber and drives the search for improvements in recycling technology and equipment. In 2003, more than 290 million scrap tires were generated in the United States. Of those, nearly 100 million were recycled into new products and 130 million were reused as tire-derived fuel in various industrial facilities.

Uses for recycled tires fall into one of three major categories: tire-derived fuel (TDF), civil engineering applications, and ground rubber applications. Civil engineering and TDF applications account for roughly half of the scrap tire waste stream. Scrap tires for TDF and civil engineering applications are shredded into chips approximately three inches square. Fibrous cord and steel wire used in belting and bead reinforcement typically remain embedded in the rubber though the bead portion is often removed and scrapped. While these applications dramatically reduce the volume of scrap tires, both considered low value applications since they recovery relatively little of the energy investment in the tires.

The third major use for scrap tires is applications requiring ground rubber, that is rubber comminuted to sizes on the order of 10 mesh or smaller. Ground rubber applications represent the highest value-added uses of scrap tires and include applications in which the rubber particles are incorporated in a variety of products such as asphalt modifications, molded products, sport surfacing and manufacturing of new tires. The use of scrap tires in ground rubber applications makes far more economic and environmental sense than TDF and civil engineering applications.

It is desirable to have an efficient and durable tire rubber granulator apparatus capable of comminuting large volumes of scrap tires into crumb rubber efficiently. It is also desirable that the tire rubber granulator apparatus be capable of minimizing the amount of rubber wastage during the wire and fibrous material separation process. It is further desirable that the tire rubber granulator apparatus be adjustable to accept a variety of sizes of input material and to produce various sizes of crumb rubber. Finally, it is desirable that the tire rubber granulator apparatus be easily alterable to enable comminuting a range of recyclable materials beyond scrap tires.

2. Description of the Prior Art

Producing ground rubber, also known as crumb rubber, is a costly process. Tire rubber is highly resilient and therefore difficult to grind efficiently. Multiple processing steps are often required to obtain crumb rubber of a commercially viable size and quality. Bead wire, steel belts and fiber are embedded in the rubber and must be separated from the rubber crumb. The value of rubber increases tenfold when the wire and fiber is removed, but conventional equipment capable of efficiently grinding scrap tires and removing the embedded wire does not fully capitalize on this difference. Conventional tire grinding apparatus typically discard portions of scrap tires to avoid processing the wire and waste a significant portion of the scrap rubber.

Tires are typically recycled by first removing the tire bead where the heaviest gauge wire is contained using a dedicated machine. With the bead removed, the remainder of the tire carcass can be shredded or ground as desired. U.S. Pat. No. 6,249,949 by Cross, Jr. et al. and U.S. Pat. No. 5,768,764 by Batt disclose apparatus specifically designed to remove tire beads from scrap tires. While removing and scrapping tire beads prior to tire comminuting eliminates the larger gauge wire from the recycling input, tire beads also contain significant amount of rubber. Scrapping the bead results in a high level of rubber wastage and increased scrap disposal costs.

Once the bead is removed, there are several methods for further comminuting the scrap tires. These are generally categorized as shredding or slicing methods, and grinding methods. Conventional rubber recycling grinders typically contain a pair of counter-rotating, parallel rollers with a small separation between them and/or interacting teeth axially spaced along the rollers. Material to be ground is forced between the rollers and sheared by interaction of the teeth. The cutting elements of one roller extend into spaces between the cutting elements on the opposing roller so that the cutting elements interact to cut rubber as it is fed into the spaces. Such machines are designed to reduce whole tires to chips on the order of three inches square. U.S. Pat. No. 4,614,308 by Barclay, U.S. Pat. No. 5,048,764 by Flament, and U.S. Pat. No. 6,036,128 by Cramer disclose various machines typical in the shredding art. Other similar apparatus rely on knife-like teeth to slice the tires into tire chips. U.S. Pat. No. 5,024,386 by Morris discloses an apparatus utilizing slicing to reduce the scrap tires. Two limitations of shredding/slicing technology are the inability of such machines to further reduce tire chips to crumb rubber and that wire beads must typically removed prior to shredding since the heavy wire common in tire beads will dull or damage the cutting edges thereby increasing maintenance requirements on the machine. Additionally, these machines require large amounts of energy to overcome the resiliency of the rubber and break the rubber into smaller pieces making them expensive to operate.

Grinding apparatus are used when the desired output is granulated rubber, also known as rubber crumb. Some grinders employ two-roll, grooved mills in which the rolls turn at slightly different rates. The speed differential creates a shear on the material which combined with the surface texture of the rolls rips the rubber into smaller pieces. Multiple passes through progressively tighter clearances in conjunction with screens to retain the larger pieces within the grinding apparatus result in crumb rubber of a desired size. Because of the tight clearances between the rollers, many conventional tire grinding machines require that tires first be cut into smaller pieces, such as TDF, prior to the grinding process and most require that scrap tires be debeaded prior to processing. Roller grinders typically require large power inputs to overcome the resiliency of the rubber. Advancements in grinding technology have targeted reducing power input requirements, developed machines capable of separating wire and fiber from the rubber crumb, and increasing the throughput of the machine. U.S. Pat. No. 5,624,078 by Bredbeck and U.S. Pat. No. 5,921,480 by Wenzel are typical in this art.

SUMMARY OF THE INVENTION

The present invention improves upon existing tire shredding and grinding technology and provides a single apparatus capable of reducing scrap tires, in whole or in shredded form, to crumb rubber on the order of 6 to 10 mesh size, or smaller, free of wire and fiber. The preferred embodiment of the invention as described herein is capable of producing over 100 pounds of 6–10 mesh tire crumb per minute using TDF as an input material. Greater capacities are easily accomplished by changing the size or rotational speed of the cutting heads. One object of the invention is to accommodate all parts of a scrap tire, including wire strands used in belting and beads, without damaging the apparatus. Tire beads, especially those from large truck, generally contain the heaviest gauge wire. The beads also contain a significant volume of rubber. Tire beads are often removed and scrapped prior traditional grinding processes since the grinding elements in conventional grinding machines are dulled or damaged by bead wire. The present invention eliminates this traditional source of rubber wastage compared to other granulators known in the art by grinding the rubber in the bead area along with the rest of the scrap tire.

In the preferred embodiment described herein, matched, cutting heads formed from disks having juxtaposed working surfaces are arranged on a common axis. At least one of the cutting heads rotates about the common axis. Each cutting head also includes a plurality of cutting bars arranged radially and approximately evenly spaced on the working surface of the cutting head. One head has an even number of cutting bars and the other has an odd number of cutting bars. Maximum efficiency is achieved when the number of cutting bars on the cutting heads differ by one. In the preferred embodiment, the rotating head contains eight cutting bars while the stationary head contains seven. The cutting edges of the cutting bars on opposing heads are parallel so that the gap between opposing bars remains approximately constant along their length. By adjusting the gap between the cutting bars to correspond to approximately the diameter of the most prevalent wire in the input material, the cutters will cleanly strip the rubber from the wire thereby allowing more rubber to be granulated instead of scrapped with the wire. Larger wires will be cut by the cutting bars until the remaining pieces will pass between opposing cutting bar edges and be discharged.

Cutting head rotational speed may be adjusted to optimize the throughput of the machine for the physical characteristics of the input material. Each cutting head disk contains a plurality of tapered recesses into which material is fed so that it may be comminuted by operation of the machine. The shape of the recesses is defined by the surface of the cutting head disk, a pair of adjacent cutting bars, and a close-off skirt located adjacent to the perimeter of the cutting head. The recesses are narrow and extend deeper into the cutting head near the head's center and grow progressively shallower but wider near the cutting head perimeter. The contour of the recesses allows the larger pieces of rubber to be introduced into the center of the working area and then migrate toward the perimeter, driven by centrifugal force and the interaction of opposing cutting bars, only when size is sufficiently reduced to allow it to move into the narrower portions of the recesses. The desired crumb size is established by adjusting the gap between the close-off skirts on the cutting heads. Crumb rubber will remain between the cutting heads where it is ground by the cutting bars until the rubber crumb is small enough to pass through the gap in the close-off skirts and exit the working area of the machine.

The preferred embodiment of the invention described herein is based upon 60 inch diameter cutting head disks; however, the tire rubber granulator design is scalable. Larger diameter cutting heads may be used to enable the invention to granulate larger-sized input material without affecting its ability to produce crumb rubber of the desired size. It is through scalable design that the invention can be sized to accommodate a wide array of input material sizes, up to and including whole tires, truck tires, or other rubber material capable of being forced into the comminution area by the feed apparatus.

This invention also enables the time between maintenance operations to be increased which maximizes the throughput of the invention. This is accomplished in the present invention in several ways. Rectangularly shaped cutting bars are robustly designed to withstand high stresses and are made from hardened steel. Comminution is performed through the interaction of two opposing square-edge bars. Square edges are much more resistant to wear and damage that conventional knife-edge cutting elements. Time savings are realized by eliminating the need to separate or classify material prior to feeding into the invention and by increasing the time the cutting bars will effectively grind the material before requiring edge sharpening.

The present invention is also capable of operation in either rotational direction. Reversing the cutter head rotational direction exposes fresh cutting edges on the previously following edge of the cutting bars, effectively doubling the time between required blade maintenance. Still further time savings are realized through a novel means to retain the cutting bars in the cutting heads that enables the cutter bars to be removed and replaced in a short amount of time, typically one to two hours, without significant disassembly of the machine. Removable cutting bars can be easily swapped for freshly sharpened cutter bars when cutting edges become worn. Receiving slots formed into the working surface of the cutting heads hold the cutting bars in position. Bolts securing the cutting bars in position are accessible from exterior portions of the cutter heads. These bolts prevent the cutter bars from sliding in or lifting out of the receiving slots while the invention is operating. Once removed, the bars may be flipped over to expose two fresh cutting surfaces or replaced with a sharpened set of cutter bars. An additional benefit of the cutting bar retention method is that no fasteners are located within the working area of the apparatus where they might damage the cutting edges in the event they loosen and become entrained in the input material.

The invention also minimizes the power input requirement for the machine to control capital and operating costs. Cutting bars on opposing cutting heads interact as the cutting heads rotate relative to one another resulting in a shearing area between the cutting bars that comminutes the scrap tire material. Since the number of cutting bars on opposing cutting head differ by one, no more than one opposing pair of cutting bars will begin their shear interaction at any point in the cutting head rotation. The rotating cutting heads cause the cutting bars interact in a manner where the shear point between the cutting bars moves outwardly along the cutting bar length as the cutting heads rotate, similar to the shearing action in a pair of scissors, so that the force encountered as material is initially sheared between the cutting bars is applied over the length of the cutting bar over a small interval of time rather than instantaneously would occur if the cutter bars interacted along their entire length at the same instant in time. The cutting bar arrangement also causes at least one pair of opposing cutting bars to interact at all times during cutting head rotation. The shock loading and instantaneous power demand are reduced to the level of input power needed to drive one cutting bar pair through the shear zone. In contrast, if both cutting heads contained the same number of cutting bars, multiple pairs of cutting bars would begin shearing simultaneously. Additionally, the rotating cutting heads cause the cutting bars interact in a manner where the shear point moves outwardly along the cutting bar length as the cutting heads rotate, similar to the shearing action in a pair of scissors, so that the magnitude of the force created as material is sheared between the cutting bars is distributed over a small interval of time rather than instantaneously, further reducing stresses within the cutting bars. Lower stresses in the cutting bars allow them to remain sharper longer during operation and further contributes to the lower input power requirements for a given crumb rubber output.

Lowering the input power also reduces the heat input to the process material. By reducing the power input requirements and lowering the maximum temperature to which the process material is subjected, machine operating costs are lowered, the risk of fire is lessened, and the machine is simplified by eliminating the need for an elaborate cooling system for the process material while it is withing the working area of the cutting heads.

DETAILED DESCRIPTION OF THE INVENTION

When referring to the Figures, like parts are numbered the same in all of the Figures. Components and structures comprising the stationary and rotating head assemblies have numbers greater than 100. Numbers for similar parts and components used on both the comprising the stationary and rotating head differ by 100.

Figure 1:
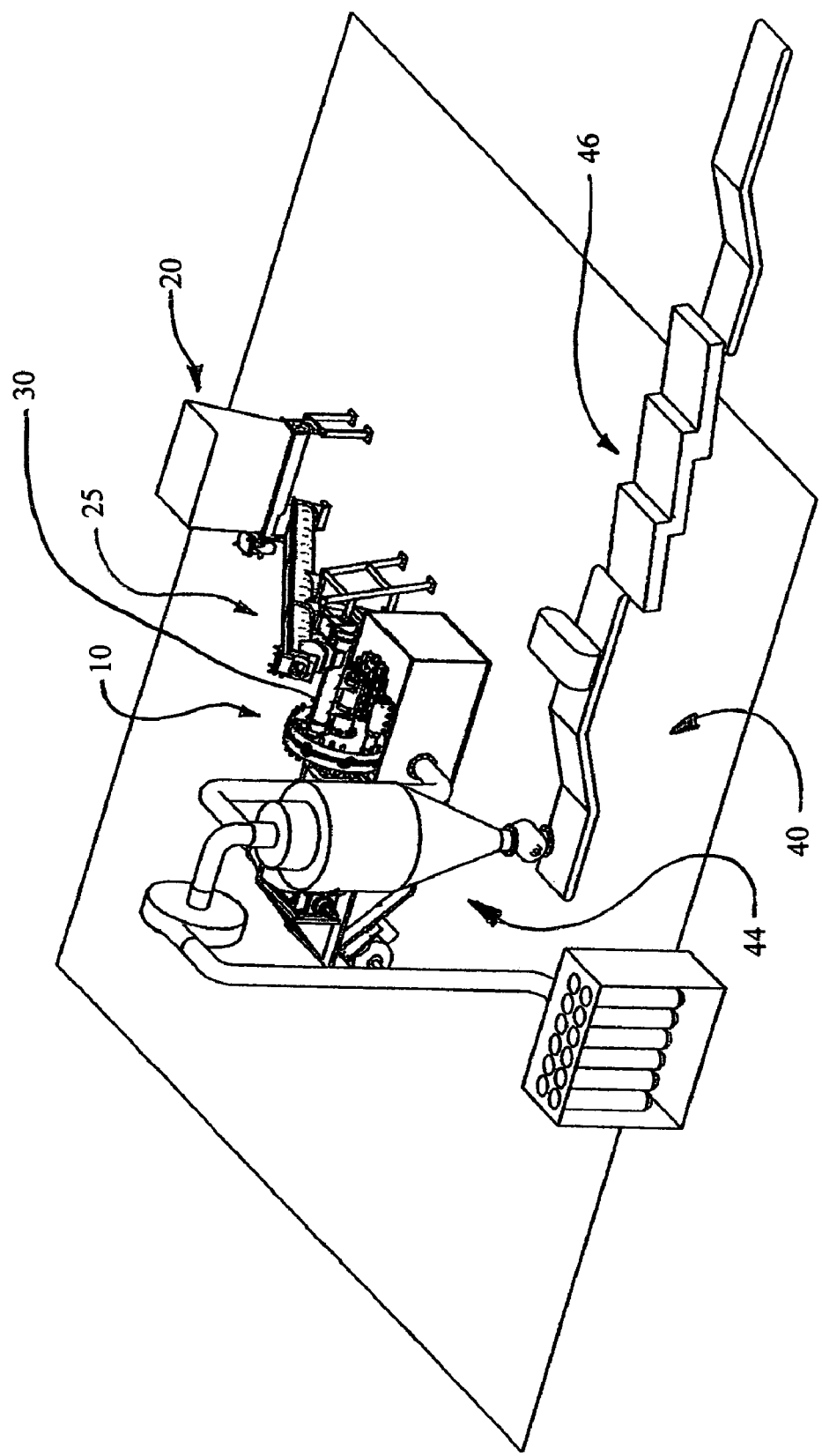
FIG. 1 shows the invention as it might be used with other conventional equipment used in a material recycling process.

Referring to FIG. 1, the preferred embodiment of a tire grinding system is shown that incorporates tire rubber granulator 10, and other conventional elements of a material recycling process. Material to be ground is introduced to the system via a input hopper 20. The material to be recycled in the preferred embodiment is scrap tires in the form of TDF. The input material is transported from input hopper 20 to tire rubber granulator 10 by material feed system 25, comprising a conveyor, auger, or other similar material transport apparatus. Material feed system 25 delivers the material to be granulated to granulator feed 30. Granulator feed 30 is a conventional screw auger feeder capable of moving the TDF into tire rubber granulator 10 at a rate sufficient for efficient operation, without gravity assistance and while preventing feed material backflow. In the preferred embodiment, TDF is fed to tire rubber granulator 10 at a rate of 100 to 200 pounds per minute. Material enters the working area of tire rubber granulator 10 through granulator feed inlet 118, shown in FIG. 4, where the material is comminuted to the desired granule size and discharged. Granulated material is collected by material discharge system 40 which includes a shroud 42 that surrounds the stationary and rotating cutting head assemblies, shown in FIG. 2, a cyclone separator 44, and a magnetic conveyor system 46. The pressure inside the shroud 42 is maintained at a slight negative air pressure to cause granulated rubber to flow from higher pressure area within the tire rubber granulator into the material discharge system. The air flow also cools the granulated rubber so that it poses less risk of fire or injury to personnel.

Scrap tires contain fibrous materials and steel wire from belting and bead reinforcement; these materials are present in the granulated material discharged from the granulator and must be separated from the rubber to produce rubber crumb. Discharge system 40 directs the granulated material to a conventional cyclone separator 44, which removes the fibrous material from the granulated material. The remaining granulated material is directed to a magnetic conveyor system 46 which separates the ferrous wire pieces from the granulated material stream. What remains in the granulated material stream is crumb rubber free of fibrous and metallic contaminants and suitable for use in a variety of recycled rubber products.

The rate of granulated rubber output is dependent upon the degree of non-rubber material in the input feed. Using TDF that is 99.5% wire free as an input material allows granulated rubber output approaching the input feed rate. In the preferred embodiment described, the output rate will approach 200 pounds per minute using wire-free TDF as an input material. Higher levels of wire in the material feed do not affect the input feed rate, but will affect the rate of granulated rubber output since a higher proportion of the input material weight is wire. The weight of fibrous material generally present in scrap tires is small relatively to the weight of rubber and does not affect granulated rubber production to the same extent as wire.

Figure 2:
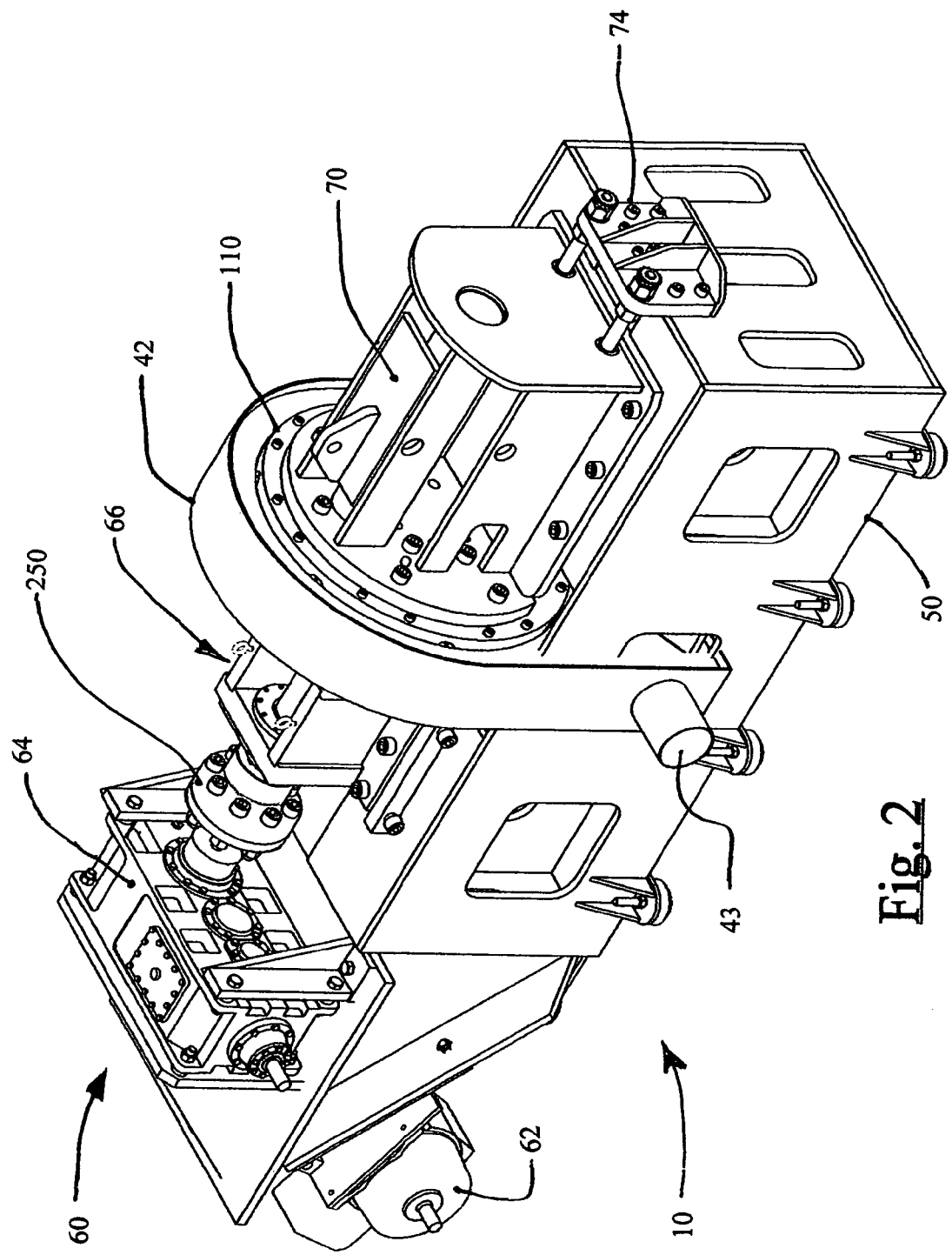
FIG. 2 shows an isometric view of the invention.

FIG. 2 is an isometric view of tire granulator 10. Mounting base 50 provides a stable, robust foundation structure for the tire rubber granulator. A pair of matched diameter, circular disks are arranged on a common axis and supported by the mounting base. The disks are approximately five feet in diameter, constructed of steel, and provide support for other elements of the cutting head assemblies, described hereinafter. The disks are surrounded by shroud 42 which removes granulated material from the cutting heads and delivers it to the material discharge system via shroud outlet 43. In the preferred embodiment, one cutting head rotates while the other remains stationary. Rotational input is provided by drive mechanism 60 which is capable of driving the rotating cutting head at variable rates and in either direction. In the preferred embodiment, the cutting head rotational speed ranges from 80 to 100 rpm and requires approximately 250 horsepower. As shown, drive mechanism 60 includes a variable speed electric motor 62, gearbox 64, and a support bearing 66 for rotating cutting head 210. For clarity in the Figure, the drive belt and pulleys connecting the electric motor 62 output to the gearbox 64 input are not shown. Other drive mechanisms are envisioned, including direct drive of the input shaft or adding an external gear on the perimeter of rotating cutting head 210 driven by one or more variable speed motors engaged to the external gear by pinions.

The stationary cutting head 110 is attached to the mounting base 50 and held in position by stationary head mount 70. Stationary head mount 70 may be moved parallel to the axis of rotation 105 using gap adjustment mechanism 74 to vary the gap between the opposing cutting heads. The mounting supports and mounting base are constructed of steel and also robustly designed to prevent unwanted deflection in the parts. The invention relies on tight control of relatively small clearances for proper operation which is achieved by using massive elements in the primary support portions of the invention.

Figure 3:
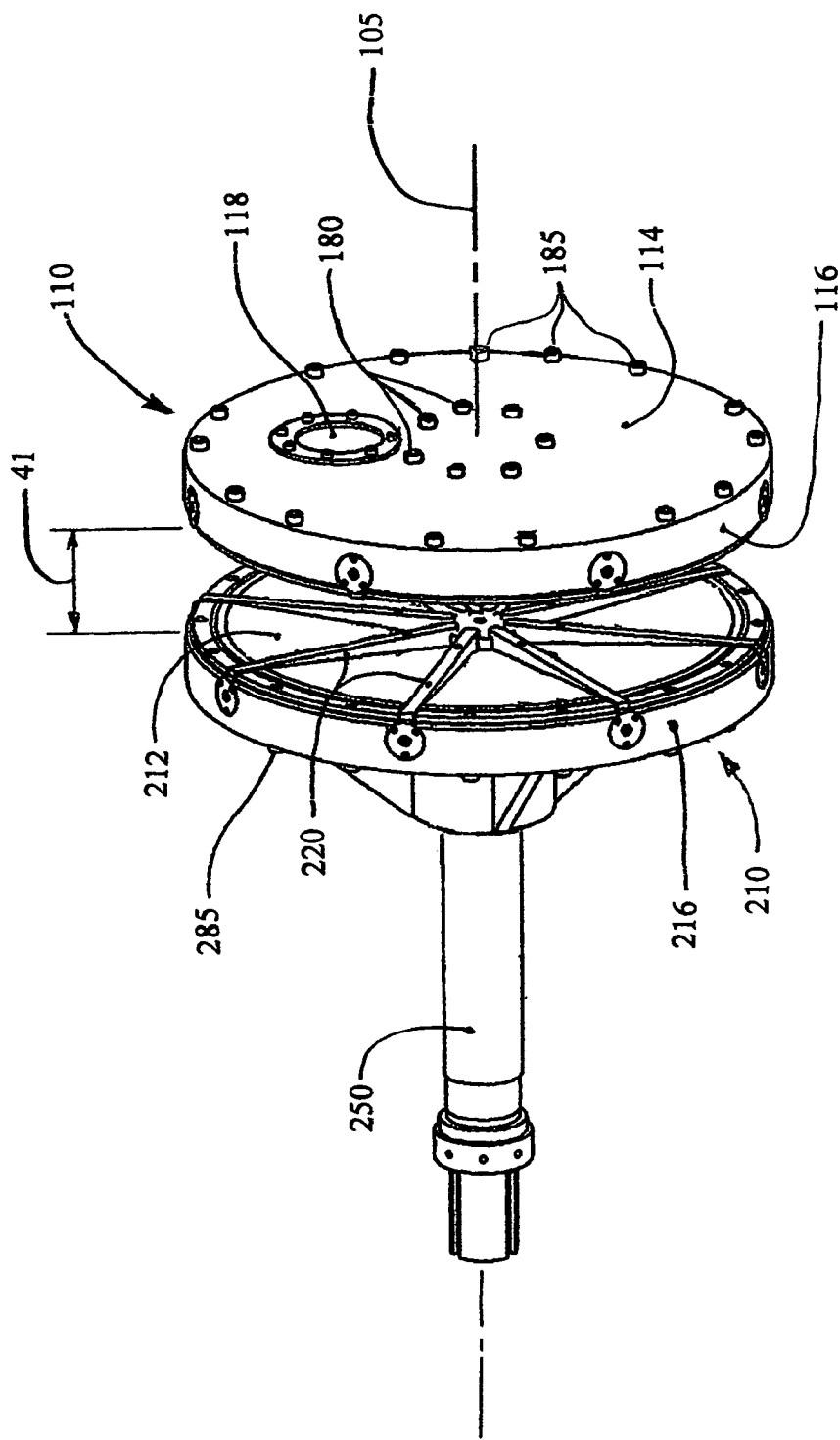
FIG. 3 is an isometric view of the stationary and rotating cutting head assemblies as they are arranged in the invention.

FIG. 3 shows the cutting heads as they are oriented in the tire granulator, though opening 41 near the perimeter of the cutting heads is shown much greater than normal for illustrative purposes. Scrap tire process material enters the working area via material feed inlet 118 which passes through stationary cutting head 110 from the exterior surface 114 to the interior surface. Also shown is rotating cutting head 210 which is attached to drive shaft 250. The center of stationary cutting head 110, rotating cutting head 210, and drive shaft 250 are oriented along a common axis of rotation 105 when installed in the preferred embodiment of the tire rubber granulator. The rotating cutting head includes exterior surface 214, perimeter 216, and interior surface 212 on which a group of cutting bars 220 are located. A similar group of cutting bars are located on the interior surface of the stationary cutting head though they differ in number from the number those on the rotating cutting head. The cutting bars are designed to be easily removed and replaced without requiring removing the cutting heads from the tire rubber granulator. Additional cutting bar features and mounting details are provided in subsequent figures.

Figure 4:
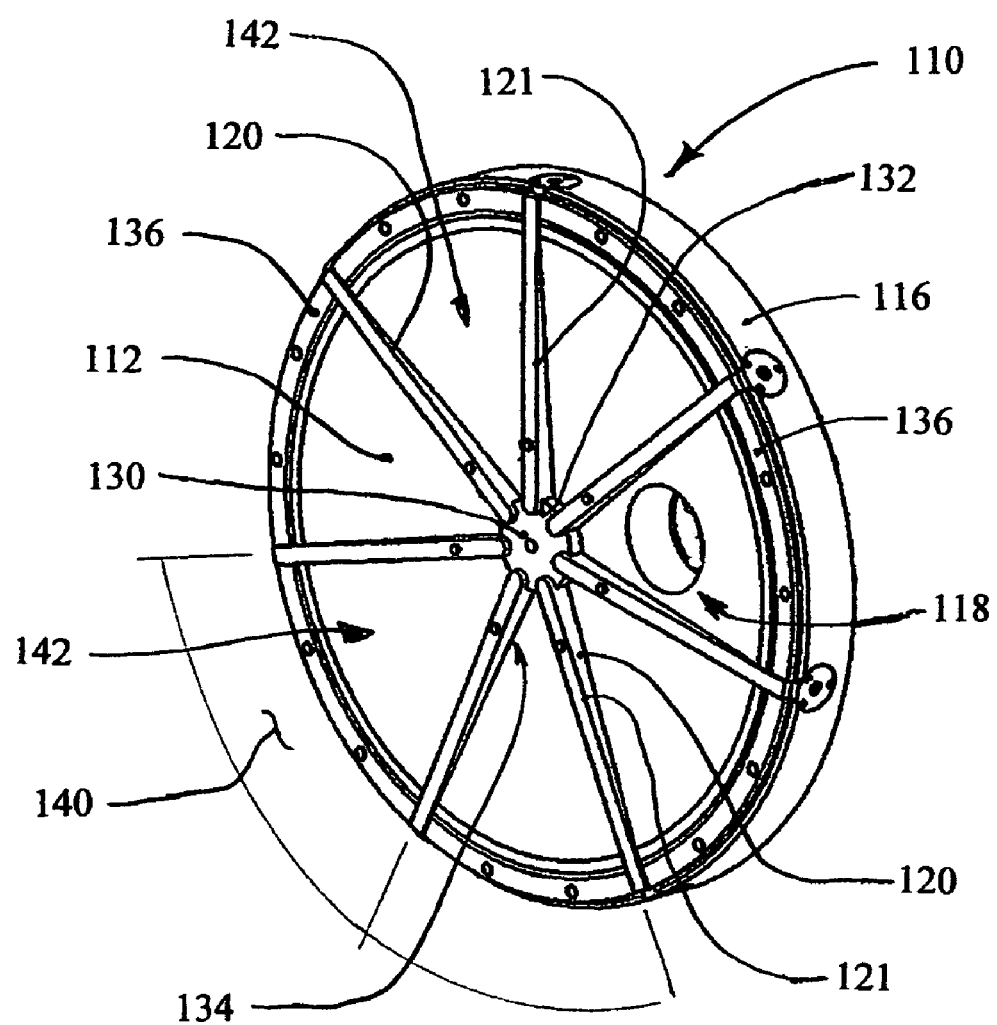
FIG. 4 is an isometric view of the interior surface of the stationary cutting head of the invention.

FIG. 4 shows stationary cutting head 110. Stationary cutting head 110 contains a multiple cutting bars 120 arranged radially about the interior surface 112 of the cutting head, extending from a central hub 130 to the cutting head perimeter 116. Each cutting bar has at least one cutting edge 121 that is aligned in a plane normal to the rotational axis, referred to as the working plane 140. In the preferred embodiment, seven cutting bars are arranged symmetrically on the interior surface and each cutting bar has four edges, two of which are located on the working plane. The number of cutting bars may be altered depending upon the size of the cutting heads, material to be recycled, and the desired throughput of the machine. Each cutting bar 120 is located in a receiving slot 134 formed in the interior surface of the cutting head and oriented radially to the center of rotation. Hub 130 is located at the center of rotation 105. The hub 130 includes a number of alignment guides 132 equal to the number of cutting bars and having a configuration complimentary to the inward end configuration of the cutting bars to restrain the cutting bars and assist in alignment. The width of receiving slot 134 and the configuration of cutting bar 120 are such that the cutting bar fits tightly in the receiving slot 134 but with sufficient clearance to allow it to slide in the receiving slot. The inward end of receiving slot 134, alignment guide 132, and the inward end of cutting bar 120 are shaped to precisely align the cutting bars each time they are inserted so that fasteners securing the cutting bars to the cutting head may be easily inserted without having to wiggle the cutting bars to insert the fasteners.

The interior surface 112 of the cutting head is sloped from the center of rotation to approximately the perimeter 116. The slope is oriented so that the distance from the working plane 140 to the interior surface 112 is greater near the center of the cutting heads and lesser near the perimeter of the cutting heads. A plurality of tapered recesses 142 are formed by cutting bars in concert with the interior surface. A similar configuration exists on the interior surface of the rotating cutting head so that material will be trapped in the tapered recesses of both head assemblies when they are arranged in the tire rubber granulator. The material to be comminuted is fed into the tire rubber granulator through feed inlet 118 near the center of the cutting head where more space between the tapered interior surfaces of the cutting head assemblies is greater. Material migrates toward the perimeters of the head assemblies as it is ground into smaller pieces and will fit into the progressively smaller space between the two interior surfaces. The degree of taper is influenced by the size of the input material and the diameter of the cutting heads. The tapered recesses must be sufficiently sized near the center of the cutting head to contain the input material and taper to approximately the desired material discharge size near the head perimeter. For the same input material, less slope is needed for larger diameter cutter heads; more slope is needed for smaller diameter cutting heads. The taper may range from 1 degree to as much as 10 degrees in smaller diameter heads or when extremely large input material is used. In the preferred embodiment, a 4 degree taper is used on 60-inch diameter cutting heads with TDF as the input material.

Also shown in FIG. 4 is the head close-off skirt 136 located adjacent to the perimeter of the cutting head. The close-off skirt 136 controls radial movement of the material out of the tapered recesses 142, allowing granulated material to be discharged only when it is small enough to pass through the opening formed by close-off skirt 136 on the stationary cutting head and the corresponding close-off skirt 236 on the rotating cutting head 210, shown in FIGS. 5A and 5B. The opening 41 between opposing head close-off skirts is adjustable to allow various granule sizes to be produced. Close off skirt 136 is fastened to the cutting head assembly using bolts 185, shown on FIG. 3, that extend through to the close-off skirt 136 from the exterior surface 114 of the cutting head 110. The close-off skirt 136 is formed from steel and curved to match the perimeter of the cutting head. In the preferred embodiment, the close off skirt 136 is comprised of segments having the same number as the number of cutting blades.

Figure 5A:
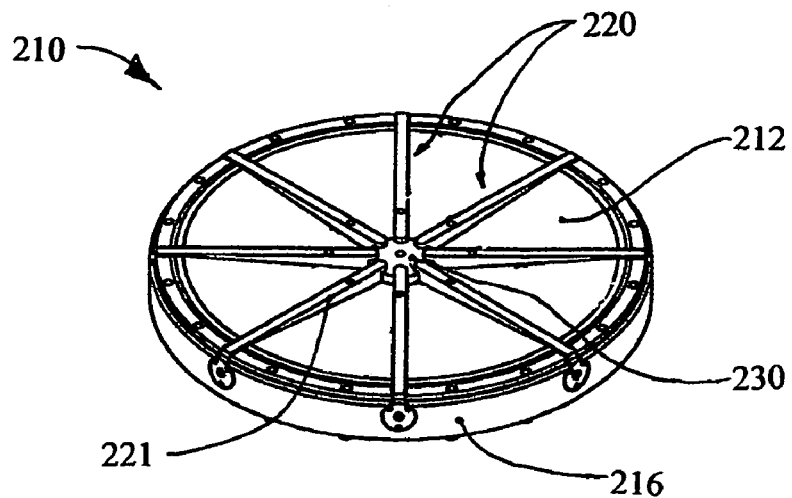
FIG. 5A is an isometric view of the rotating cutting head in the invention.
Figure 5B:
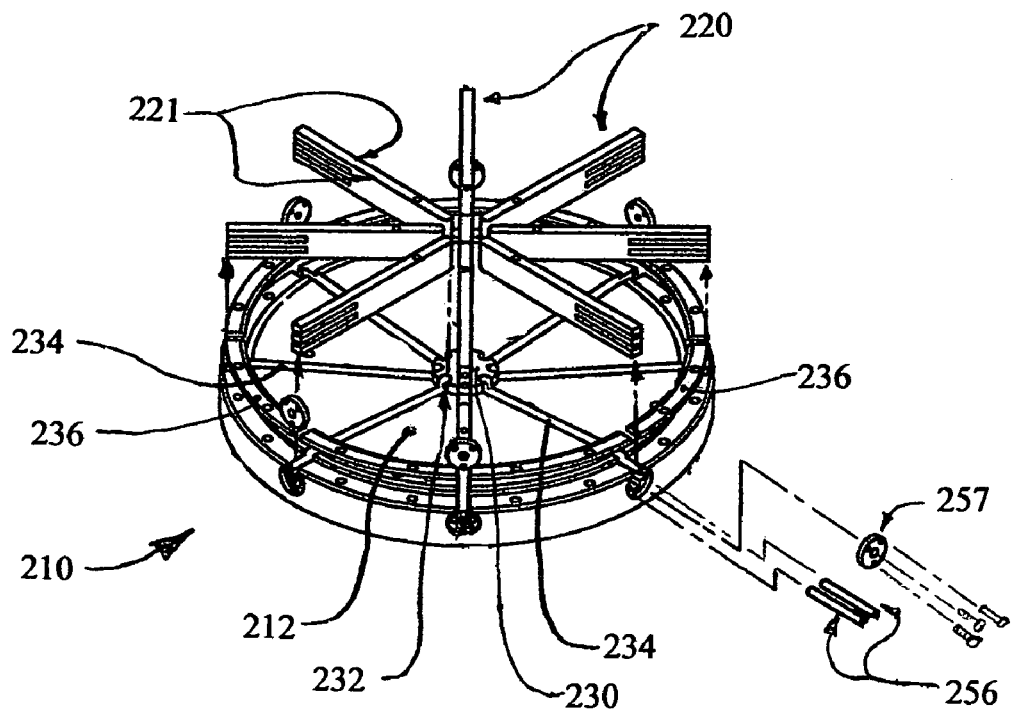
FIG. 5B is an exploded view of FIG. 5A in which the cutting bars are shown removed from their normal operating location.

FIGS. 5A and 5B show details of rotating cutting head 210. In the preferred embodiment, the design of rotating cutting head 210 is similar to stationary cutting head 110 with the exception of the number of cutting bars and the absence of a feed inlet. Numbering for items similar to those shown in FIG. 4A is increased by 100. Additionally, rotating cutting head 210 rotates relative to stationary cutting head 110 in the preferred embodiment. Shown are a plurality of cutting bars 220 are mounted to rotating cutting head 210. Eight cutting bars are shown in this preferred embodiment, arranged symmetrically on the working area of rotating cutting head 210. The number of cutting bars may be altered depending upon the size of the cutting heads, material to be recycled, and the desired throughput of the machine. Each bar is located in a receiving slot 234 located on the interior surface 212 of the rotating cutting head 210 and oriented radially to the center of rotation 105. Hub 230 is located at the center of rotation and restrains the inward end of the cutting bars. The hub 230 includes a number of alignment guides 232 equal to the number of cutting bars and having a configuration complimentary to the inward end configuration of the cutting bars 220 to restrain the cutting bars and assist in alignment. The width of receiving slot 234 and cutting bar 220 are sized such that cutting bar 220 fits tightly in the receiving slot 234 but with sufficient clearance to allow it to slide in the receiving slot. The inward end of receiving slot 234, alignment guide 232, and the inward end of cutting bar 220 are shaped to precisely align the cutting bar each time it is inserted so that central bar fasteners 280, shown in FIG. 6, securing the cutting bars to the cutting head may be easily inserted without having to wiggle the cutting bar to insert the fasteners. Cutting bar 220 is held in position by a central bar fastener 280 near the interior end and by a pair of bar retainers 256 and a retainer plate 257 at the distal end adjacent to the cutting head perimeter 216. All fasteners are easily accessible from outside the working area of the cutting head to enable cutter bar removal for sharpening or replacement in a short amount of time.

FIG. 5B also shows close-off skirt 236 elevated from its normal position. Adjustment of opening 41, shown in FIG. 3, is accomplished by installing shims of various thicknesses between the interior surface 212 of the cutting head and the close-off skirt. This adjustment is made in connection with adjustment of the gap between opposing cutting bars since opening 41 will also vary as the separation between the cutting heads is changed. In the preferred embodiment, the gap between opposing cutting bars is first determined. Once this gap is established, the desired crumb size may then be set by installing shims of the required thickness to establish opening 41.

In the preferred embodiment, stationary cutting head 110 remains stationary while rotating cutting head 210 rotates to simplify supplying material to the working space between the cutting heads. Other drive mechanism variations which transfer power to the outer perimeter of the cutting heads are possible. Such drive mechanisms allow material to be fed into the working area through a centrally-located feed inlet located along the rotating axis. One or both cutting heads could be rotated in this arrangement. In the event that both cutting heads rotate, their directions of rotation would opposite to one another. Power input requirements for each individual head are reduced since the total input power is divided between the two heads which allows smaller driver to be employed for each head compared to a single, larger driver acting on only one head. Employing smaller drivers reduce manufacturing and maintenance costs. In the case of electric motors, a motor producing approximately one-half of the power compared to another motor generally reduces the cost of the motor by much more than one-half.

The cutting edges 121 and 221 of cutting bars 120 and 220 are juxtaposed, oriented parallel to each other, and are slightly separated so that they do not contact each other when the cutting heads 110 and 220 rotate. Opposing cutting bars interact as the cutting heads rotate resulting in a shearing action between the cutting edges 121 and 221 that comminutes the process material. The preferred embodiment using seven cutting bars on one head and eight on the other yields approximately 375 linear inches of cutting edge per cutting head revolution. Clearance between the opposing cutting edges is adjusted by moving one of the cutting heads along the axis of rotation so that a small gap exists between opposing cutting bar edges. The gap generally ranges from 0.004 to 0.020 inches and is dependent upon the characteristics of the input material. By adjusting the gap between the cutting bars to correspond to approximately the diameter of the most prevalent wire in the TDF, the cutting bars will strip the rubber from the wire thereby allowing more rubber to be granulated instead of scrapped with the wire. Larger wires will be cut by the cutting bars until the remaining pieces will pass between opposing cutting bars and eventually be discharged through opening 41.

Since the number of cutting bars on the opposing cutting heads differ by one, no more than one opposing pair of cutting bars will be initiating shearing interaction at any point in the cutting head rotation. The rotating cutting heads cause the cutting bars interact in a manner where the shear point between the cutting bars moves outwardly along the cutting bar length as the cutting heads rotate, similar to the shearing action in a pair of scissors, so that the force encountered as material is initially sheared between the cutting bars is applied over the length of the cutting bar over a small interval of time rather than instantaneously would occur if the cutter bars interacted along their entire length at the same instant in time. The cutting bar arrangement also causes at least one pair of opposing cutting bars to interact at all times during cutting head rotation. The shock loading and instantaneous power demand are reduced to the level of input power needed to drive one cutting bar pair through the shear zone. In contrast, if both cutting heads contained the same number of cutting bars, multiple pairs of cutting bars would begin shearing simultaneously. An example using cutting heads with 8 cutting bars per head would require eight times the power to drive one pair of bars in shear. Moreover, the power input requirements would cycle between maximum occurring when all the cutting bars aligned as shearing was initiated, and a very low value when no cutting bars are shearing the process material. The reduced power demand is evidenced by comparing the present invention to other similarly capable tire grinders. Conventional grinders capable of production rates of approximately 35 pounds per minute generally require motors in the 300 horsepower range. These conventional grinders often result in additional effort necessary to achieve the desired crumb rubber size since they are only capable of reducing rubber to certain sizes, often much larger than the desired rubber crumb. The present invention is capable of producing up to 100 pounds per minute of crumb rubber using a 250 horsepower motor.

Figure 6:
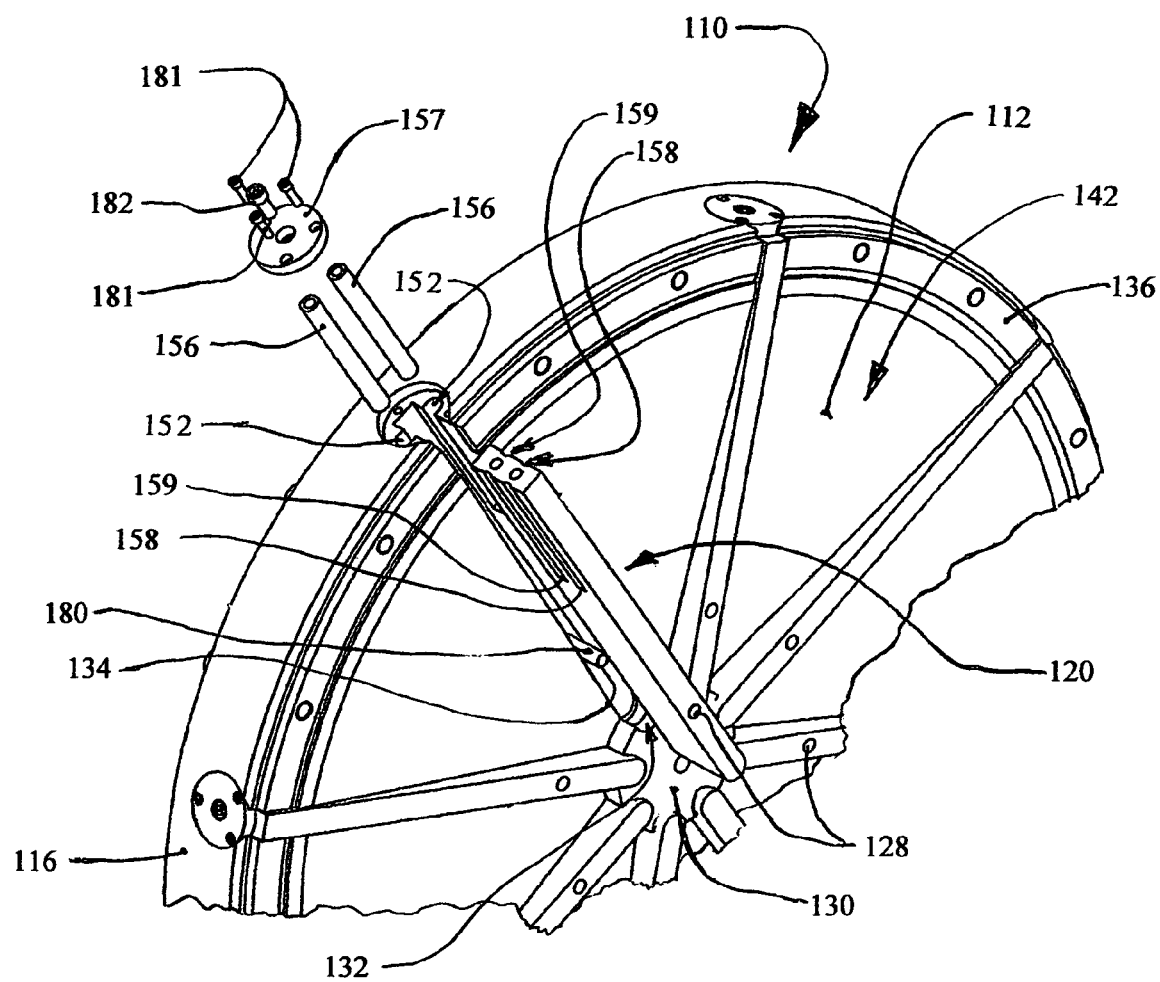
FIG. 6 is a partial view of a cutting head showing the attachment details for a cutting bar.

FIG. 6 shows a partial view of a cutting head with details of the cutting bar to cutting head attachment. Numbering in this figure is based on the stationary cutting head; however, like pieces used on both the stationary and the rotating cutting head have numbers increased by 100 on the rotating cutting head.

A cutting bar 120 is shown removed from its receiving slot 134. Central bar fastener 180 is shown in its position in receiving slot 134. When cutting bar 120 is in its installed position, central bar fastener 180 engages a threaded hole 128 in the cutting bar to retain cutting bar 120 in place on the cutting head. Hub 130 is shown along with several alignment guides 132. The alignment guides 132 are arranged to secure the inward end of the cutting bar 120 and to assist in alignment during cutting bar maintenance. The inward end of receiving slot 134, alignment guide 132, and the inward end of cutting bar 120 are shaped to precisely align the cutting bar each time it is inserted so that central bar fastener 180 may be easily inserted without having to wiggle the cutting bar to insert the fastener. The opposite end of the cutting bar is restrained by a pair of bar retainers 156, a retainer plate 157 held in position by a group of threaded fasteners 181 which secure retainer plate 157 to the cutting head 110 and a bar end fastener 182 which secures retainer plate 157 to cutting bar 110. A first pair of retainer grooves 158 are formed into the two opposite sides of cutting bar 110. In the preferred embodiment, the radius of retainer grooves 158 corresponding to the outside radius of bar retainers 156. The first pair of retainer grooves 158 extend lengthwise approximately nine inches along the longitudinal axis of cutting bar 110. When cutting bar 110 is in its assembled position, the first pair of retainer grooves interact with the bar retainers to hold the cutting bar in position. A second pair of retainer grooves 159 are positioned on cutting bar 130 to enable the cutting bar to be flipped over about its longitudinal axis to expose a fresh set of cutting edges and still be securely fastened to cutting head 120. Bar retainers 156 also interact with a pair of bores 152 when the cutting bars are in their assembled position. The combination of a retainer groove 158 and bore 152 forms a cylindrical-shaped recess into the cutting bar and cutting head into which bar retainer 156 can be inserted. Clearance between this cylindrical-shaped recess and bar retainer is limited so that movement of the cutting bar is prevented. Retainer plate 157 is then used to hold bar retainers 156 securely in position. Bar end fastener 182 engages a tapped hole in the end of cutting bar 110 and secures retainer plate 157 to the cutting bar. Retainer plate fasteners 181 engage tapped holes in cutting head 110 to secure the retainer plate to the cutting head. By locating all of the fastening devices restraining cutting bars or other parts of the cutting head assemblies on the exterior surface 114 or perimeter 116 of the cutting head where they are easily accessible, the time required to remove the cutting bars or flip them over to expose fresh cutting edges is shortened. All fasteners are easily accessible from outside the working area of the cutting head to enable cutter bar removal for sharpening or replacement in a short amount of time. Additionally, no fasteners are located in the working area of the cutting heads where a dislodged fastener could mix with the input material and damage the cutting edges.

Although the invention has been described in connection with specific examples and embodiments, those skilled in the art will recognize that the present invention is capable of other variations and modifications within the scope of the invention but beyond those described herein. These examples and embodiments are intended as typical of, rather than in any way limiting on, the scope of the present invention as presented in the following claims.

We claim as new and for which a Letters Patent of the United States is desired to be secured is:

1. A tire rubber granulator for reducing scrap tire rubber into small particles of a pre-determined size comprising:
   a first disk assembly having a first interior surface and a first exterior surface mutually bounded by a first perimeter, said first disk assembly centered on a rotational axis and further comprising:
      at least one first cutting bar, said first cutting bar having at least one cutting edge;
      a first retaining structure centered on the rotational axis and located on the first interior surface, said first retaining structure having a first group of receptacles;
      a plurality of first cutting bars located radially about the rotational axis and interconnected to the first interior surface, wherein each bar in the first plurality of cutting bars extends from the first retaining structure to the first perimeter and where said at least one cutting edge is aligned perpendicular to the rotational axis;
      a first plurality of receiving slots in the first interior surface that retain the first plurality of cutting bars in position;
      a first working plane, said first working plane defined by the cutting edges of the first plurality of cutting bars;
      at least one first curved skirt affixed to the first interior surface adjacent to the first perimeter; and
      a first plurality of tapered recesses with contours that are defined by an adjacent pair of first cutting bars in the first plurality of cutting bars, the first skirt, and the first interior surface;
   a second disk assembly having a second interior surface and a second exterior surface mutually bounded by a second perimeter, said second disk assembly centered on the same the rotational axis as the first disk assembly and the second interior surface is in juxtaposition with the first interior surface, said second disk further comprising:
      at least one second cutting bar, said second cutting bar having at least one cutting edge;
      a second retaining structure centered on the rotational axis and located on the second interior surface, said second retaining structure having a second group of receptacles;
      a plurality of second cutting bars differing in number from the number in the plurality of first cutting bars, said plurality of second cutting bars located radially about the rotational axis and interconnected to the second interior surface, wherein each member in the second plurality of cutting bars extends from the second retaining structure to the second perimeter and where said at least one cutting edge is aligned perpendicular to the rotational axis;
      a second plurality of receiving slots in the second interior surface that retain the second plurality of cutting bars in position;
      a second working plane, said second working plane defined by the cutting edges of the second plurality of cutting bars where the second working plane is in juxtaposition with the first working plane and separated by a distance;
      at least one second curved skirt affixed to the second interior surface adjacent to the second perimeter and in juxtaposition to the first curved skirt; and
      a second plurality of tapered recesses with contours that are defined by an adjacent pair of second cutting bars in the second plurality cutting bars, the second skirt, and the second interior surface;
   an apparatus interconnected to the tire rubber granulator that causes at least one of the disk assemblies to rotate about the rotational axis;
   a structure in at least one of the disk assemblies that allows scrap tire rubber to be introduced into first and second pluralities of tapered recesses; and
   an opening, said opening formed between the first and second curved skirts that allows scrap tire rubber to exit the tire rubber granulator.

2. The tire rubber granulator as described in claim 1 wherein one disk assembly is stationary and the other disk assembly rotates.

3. The tire rubber granulator as described in claim 1 wherein one disk assembly is stationary, the other disk assembly rotates, and the direction of rotation of the disk assembly is reversed.

4. The tire rubber granulator as described in claim 1 wherein one disk rotates and the other disk assembly rotates in the opposite direction.

5. The tire rubber granulator as described in claim 1 wherein one disk rotates and the other disk assembly rotates in the opposite direction and where the direction of rotation of both disk assemblies is reversed.

6. The tire rubber granulator as described in claim 1 wherein the distance separating the first and second working planes is adjustable.

7. The tire rubber granulator as described in claim 1 wherein the distance separating the first and second working planes is adjustable and further comprises an apparatus to vary the distance.

8. The tire rubber granulator as described in claim 1 wherein the opening between the first and second curved skirts is adjustable.

9. The tire rubber granulator in claim 1 wherein the distance separating the first and second working planes is adjustable, the opening between the first and second curved skirts is adjustable, and adjustment of the distance separating the first and second working planes and the opening between the first and second curved skirts are independently adjustable.

10. The tire rubber granulator as described in claim 1 wherein one or both or the cutting head assemblies rotates, their directions of rotation may be reversed, and the cutting bars are constructed to function irrespective of the rotational direction of the cutting head assemblies.

11. The tire rubber granulator as described in claim 1 wherein the arrangement of first and second pluralities of cutting bars on the first and second disk assemblies cause at least one first cutting bar and one second cutting bar to interact at all times.

12. The tire rubber granulator as described in claim 1 wherein the first and second pluralities cutting bars are removable.

13. The tire rubber granulator as described in claim 1 wherein the first and second pluralities of cutting bars are removable from the first and second disk assemblies and move radially outward in the receiving slots during removal.

14. The tire rubber granulator as described in claim 1 wherein the first and second pluralities of cutting bars are removable and move in the direction of the axis of rotation during removal.

15. The tire rubber granulator in claim 1 wherein the first cutting bar and the second cutting bar have the same configuration.

16. The tire rubber granulator as described in claim 1 wherein the number of first and second cutting bars differ by one.

17. The tire rubber granulator as described in claim 1 further comprising an apparatus to collect and transport ground rubber from the tire rubber granulator as is exits the opening between the first and second curved skirts.

18. The tire rubber granulator as described in claim 16 further comprising an apparatus to collect and transport ground rubber from the tire rubber granulator as is exits the opening between the first and second curved skirts wherein the apparatus uses differential air pressure to cause ground rubber movement.

19. The tire rubber granulator as described in claim 1 wherein the degree of taper in the first and second interior surfaces forming the slope in the first and second pluralities of tapered recesses is in the range from 0 to 10 degrees.

20. The tire rubber granulator as described in claim 1 wherein the first and second cutting bars, and the first and second curved skirts are secured to the disk assemblies using fasteners accessible from the exterior surface of the first and second disk assemblies.

* * * * *